(12) United States Patent
Willard et al.

(10) Patent No.: US 11,846,050 B2
(45) Date of Patent: Dec. 19, 2023

(54) FISHING NET PRODUCTS

(71) Applicants: Monica Lynn Willard, Bradenton, FL (US); Korleen Alice Cochran, Bradenton, FL (US)

(72) Inventors: Monica Lynn Willard, Bradenton, FL (US); Korleen Alice Cochran, Bradenton, FL (US)

( * ) Notice: Subject to any disclaimer, the term of this patent is extended or adjusted under 35 U.S.C. 154(b) by 832 days.

(21) Appl. No.: 16/924,932

(22) Filed: Jul. 9, 2020

(65) Prior Publication Data
US 2022/0010469 A1 Jan. 13, 2022

(51) Int. Cl.
*D04G 3/00* (2006.01)
*A01K 75/00* (2006.01)

(52) U.S. Cl.
CPC .............. *D04G 3/00* (2013.01); *A01K 75/00* (2013.01)

(58) Field of Classification Search
CPC ........... D04G 3/00–04; D04G 1/00–08; A01K 75/00; A01K 75/005; A01K 75/02; A01K 75/04; A01K 75/06
See application file for complete search history.

(56) References Cited

U.S. PATENT DOCUMENTS

| | | | | |
|---|---|---|---|---|
| 2,416,521 A * | 2/1947 | Freiberg | ................... | D06Q 1/10 156/244.11 |
| 3,568,900 A * | 3/1971 | Paris | ....................... | D06F 73/00 223/70 |
| 5,494,734 A * | 2/1996 | Widders | ................... | D04D 7/02 442/50 |
| 5,680,893 A * | 10/1997 | Neer | ....................... | A47H 21/00 160/DIG. 7 |
| 7,240,517 B2 * | 7/2007 | Barak | ................ | A44C 17/0283 63/3 |
| 2005/0086723 A1* | 4/2005 | Hsieh | ..................... | A01K 55/00 2/173 |
| 2014/0057744 A1* | 2/2014 | Whitten | ............... | A63B 63/083 473/485 |

FOREIGN PATENT DOCUMENTS

CN 101724976 A * 6/2010
WO WO-2008119093 A2 * 10/2008 ............. A44C 17/02

* cited by examiner

*Primary Examiner* — Ismael Izaguirre
(74) *Attorney, Agent, or Firm* — Donald R. Boys; Central Coast Patent Agency LLC

(57) ABSTRACT

A decorative article of manufacture has a specific region of fishing net, cut from a larger expanse of fishing net, the fishing net being a structure of a first plurality of first parallel lengths of cord proceeding in a first direction, overlying a plurality of second parallel lengths of cord proceeding in a second direction, with individual ones of the cords of the first plurality joined at intersections with individual ones of cords of the second plurality, forming individual quadrilateral cells each having opposite parallel sides, and one or more solid decorative elements attached to one or more sides of individual ones of the quadrilateral cells.

23 Claims, 16 Drawing Sheets

FISHING NET PRODUCTS

BACKGROUND OF THE INVENTION

1. Field of the Invention

The present invention is in the field of personal and decorative accessories and relates to the creation of such accessories.

2. Description of Related Art

A preferred material to create the present invention disclosed herein is intercepted or reclaimed fishing net, chosen for its strength and versatility, and because there is an abundance of discarded fishing net that is lost or dumped into the oceans worldwide. Abandoned or lost net causes extensive harm to marine life, reefs, and the sea floor. Marine life and seabirds can become maimed or caused suffering and death by being entangled in the castaway net, also known as "ghost net." Ghost net not only falls to the sea floor trapping living creatures as it descends but can rise and fall over and over again bringing death and destruction to any living thing in its path. Millions of pounds of discarded net are dumped annually into the world's oceans, blanketing and choking off essential ecosystems on reefs and the sea floor. Along with the exponentially expanding crisis of discarded net and plastic trash, which can also become entangled in net and form massive trash islands that threaten the health of the seas, sea creatures, and ultimately humanity, there is an growing interest in intercepting and removing such waste and identifying with the forward thinking, environmentally positive people who do so.

In the field of repurposing reclaimed fishing net, people have found ways to recycle net by melting it down to recreate it as other objects, or to make usable fibers to fabricate products which are no longer recognizable as the fishing net it once was. People have an ever increasing interest and need in finding uses for reclaimed and recycled products, and in the case of reclaimed net, there is currently no product other than the net itself in its present state available as a consumer product. The inventors of the present invention are using fishing net in its existing form, cut into specific shapes and patterns, and manufactured by the methods described herein, to create usable accessories and objects of thoughtful design and quality craftsmanship that will provide a new range of consumer products made from fishing net. The advantages of the present invention's use of fishing net in its identifiable form of interwoven squares are that increased quantities of net will be intercepted and removed from waters, and the consumer of this invention will be able to recognize actual fishing net and the up-cycled nature of the product, thereby increasing awareness of the catastrophic consequences of the conditions facing our environment, be reminded to make conscientious, environmentally friendly choices, and be inspired to take greater actions beneficial to conservation and preservation of the environment.

Historically, people have used adornments, accessories, and objects to show support or affiliation with a cause, philosophy, or movement, and to identify themselves with clubs, parties, and social groups. Prior to the present invention, the utilization of fishing net to create structures, ribbons, links, linkage, and framework to be used as an element of design or basis for further embellishment and the method of manufacture thereof, fishing net has not been used in the manner described herein to create personal or decorative accessories and objects of high design and quality, thereby allowing the user to communicate support and interest in ocean conservation along with wearing or using an item of high design, quality, and craftsmanship. An invention such as this would allow communication of a user's environmentally positive ethos, encourage conversations about conservation, and importantly, have a direct and positive impact on our planet by causing increased quantities of net to be used artistically rather than to become a hazard.

SUMMARY OF THE INVENTION

In an embodiment of the invention a decorative article of manufacture is provided, comprising a specific region of fishing net, cut from a larger expanse of fishing net, the fishing net being a structure of a first plurality of first parallel lengths of cord proceeding in a first direction, overlying a plurality of second parallel lengths of cord proceeding in a second direction, with individual ones of the cords of the first plurality joined at intersections with individual ones of cords of the second plurality, forming individual quadrilateral cells each having opposite parallel sides, and one or more solid decorative elements attached to one or more sides of individual ones of the quadrilateral cells. In one embodiment the fishing net forms a regular matrix of rectangular cells in horizontal rows and vertical columns of cells, and the specific region of fishing net is produced by making two parallel horizontal cuts cutting through vertical cords of the fishing net and two parallel vertical cuts though horizontal cords of the fishing net. Also, in one embodiment the resulting specific region comprises a single horizontal length of cord with a specific number of joined intersections, the intersections having lashes as truncated lengths of cord. In one embodiment the resulting specific region comprises a single row of rectangular cells with joined intersections at corners of the cells, the intersections having lashes as truncated lengths of cord. And in one embodiment the resulting specific region comprises a single cell with joined intersections at the corners of the cells, the intersections having lashes as truncated lengths of cord.

In one embodiment the resulting specific region comprises multiple rows and multiple columns of cells with joined intersections at corners of the cells, joined intersections on an outer periphery of the specific region having lashes as truncated lengths of cord. Also, in one embodiment the fishing net forms a regular matrix of rectangular cells in horizontal rows and vertical columns of cells, and the specific region of fishing net is produced by making two parallel diagonal cuts at a first angle with horizontal through cords of the fishing net, and two parallel diagonal cuts at a second angle with horizontal though cords of the fishing net. In one embodiment the fishing net forms a regular matrix of rectangular cells in horizontal rows and vertical columns of cells, and the specific region is produced by cutting through cords of the fishing net from a starting point in a pattern that cuts in at least three directions, returning to the starting point, leaving the specific region with a plurality of adjacent cells. In one embodiment cords in sides of cells in the specific region are cut in a manner to produce tassels, as individual secondary regions of the specific region. And in one embodiment the single cell is folded a first time along a diagonal line through two joined intersection of the cell, and then a second time around the resulting center joined intersection, such that all four original sides of the cell are adjacent and parallel, forming a link having a length of a side of the original cell.

In one embodiment the decorative article further comprises a plurality of links joined in a line by connectors. In one embodiment the connectors are one or more of solid rings of any size or shape, with or without a split which allows opening and closing, a wired bead of any size or shape, or any combination or sequence of linked materials joining the links together or to any other material. In one embodiment specific regions cut from a fishing net, the specific regions having a common size and shape, are stacked, creating a compound region to which one or more solid decorative elements are attached to complete the decorative article. In one embodiment the specific region is in size and shape a single cell of the fishing net. And in one embodiment the specific region is in size and shape a plurality of adjacent and joined cells.

In one embodiment the resulting specific region comprises a single horizontal length of cord with two joined intersections, the intersections having lashes as truncated lengths of cord, wherein the length of cord between the joined intersections is made into a mini-tassel by pulling up cord of a side of a cell into a loop, the loop having two adjacent cord sections, and securing the loop by a fastener surrounding the two adjacent cord sections. In one embodiment the art6icle further comprises one or more eyelets formed by pulling up cord of a side of a cell into a loop, the loop having two adjacent cord sections, and securing the loop by a fastener surrounding the two adjacent cord sections. In one embodiment the fastener is one of solid rings of any size or shape, with or without a split which allows opening and closing, or a wired bead of any size or shape. IN one embodiment two or more specific regions having eyelets are integrated by passing one or more lengths of stringing material through two or more eyelets in succession. And in one embodiment the two or more specific regions joined by stringing material through eyelets are further joined by connectors.

In one embodiment the connectors are one or more of solid rings of any size or shape, with or without a split which allows opening and closing, or a wired bead of any size or shape. In one embodiment the article further comprises one or more connectors spanning across sides of individual ones of the cells in the row of cells, either horizontally or vertically, the connectors compressing the cells, providing a roping effect for the specific region. And in one embodiment the length of cord with joined intersections is crocheted in crochet loops producing a continuous crochet article.

BRIEF DESCRIPTION OF THE SEVERAL VIEWS OF THE DRAWINGS

FIG. 14A shows a straight cut ribbon.

FIG. 14B shows a structure with connectors placed vertically.

FIG. 14C shows compression of the net by placing connectors horizontally

DETAILED DESCRIPTION OF THE INVENTION

Figure 1A:
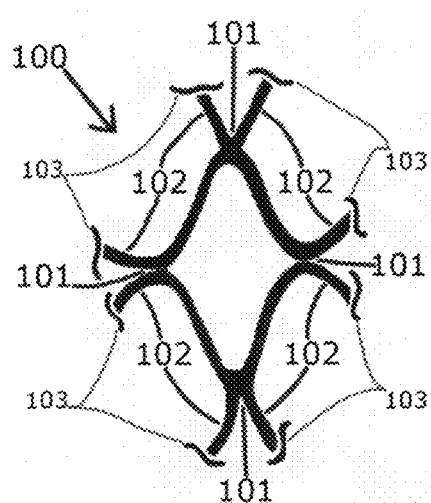
FIG. 1A shows a single unit/square of fishing net which is a basic constituent of the present invention.

A. For clarity of the illustrations, the mesh woven pattern of the fishing net is often, but not always, drawn as perfectly squared. This has been done to facilitate rendering complex and often uneven shapes into easier to draw and understand schematics.

B. Fishing net selected to create the embodiments of the invention herein may be reclaimed, intercepted, previously used, or new, and may be made of, but not limited to, nylon, polyester, Dacron, monofilament, or any synthetic or natural material, and may be machine or hand made for purposes of various types of commercial or non-commercial fishing.

C. Fishing net used can be natural, colored, coated, dyed, painted by dipping, spraying, brushing, or any method deemed appropriate to achieve the desired result.

D. Fishing net mesh sizes vary, and the inner dimensions of individual cells can vary, along with the shape, which can approximate squares, rectangles, or diamond shapes, therefore variation in the end product size and shape depending on the net that is being used at the time is inherent.

E. Figure drawings herein represent the braided, knotless type of fishing net, however, the twisted and knotted type are also included in the embodiment of all designs.

F. Figure drawings herein show embodiment patterns cut from the fishing net with "lashes," which refer to the straight cut pieces of the net that are not part of the retained structural square, but are the net as it extends into the adjoining square, which is cut away to create the pattern shape, and their length is determined by the placement of the cut. Each embodiment of every pattern may also be also created without "lashes" by cutting the perimeter of the square so close that no extra extension of net material remains.

G. Cut fishing net pattern pieces may have a raw cut, heat cut, or heat seal to melt the fibers and to prevent the individual filaments and fibers from unravelling. Heat, or any liquid, may be applied after cutting to prevent the filaments from fraying.

H. Figure drawings herein show a single ply (layer) of net for visual clarity. The embodiment of each design may include multiple ply (layers) of net. The actual embodiment uses any and all plies (layers) of net with or without the use of adhesives, sewing, or joining in any other manner with, but not limited to, metal closures, rings, loops, crimp ends, staples, clasps or wire, knotting of cord, leather, string, filament, or lacing and stringing material of any kind.

Line symbols are used in the figures to indicate pattern and shape of embodiments of the invention, the cuts by which the embodiments are achieved, where the cut is made, where folds are made, and indicates the continuation of the net and the possibility of extending the embodiments and the cut lines to the farthest edge of the net in any direction. A broken single line ( ------- ) indicates a cut line; a double broken line ( ===== ) indicates a fold line; a wavy line ( ~~~~~~ ) indicates the possibility of the continuation of the net, cut line, or useable piece, which may extend horizontally or vertically in an indeterminate manner.

In various embodiments of the invention the inventors provide a unique method for repurposing fishing net into usable structures and decorative products that enables quantities of net to be removed and intercepted from our waterways and to become useful objects as personal and decorative accessories. The invention relates to a new method of using fishing net to create structures, ribbons, links, roping, and framework to function as an element of design, basis for further embellishment, or as components of finished products, including, but not limited to, personal and decorative accessories. The invention described herein incorporates techniques in cutting, pattern making, folding, layering, manipulating, adhering, connecting, tying, and sometimes, but not always, adding at least one additional item. The present invention is described in enabling detail in the following examples, which represent more than one embodiment of the present invention.

Figure 1B:
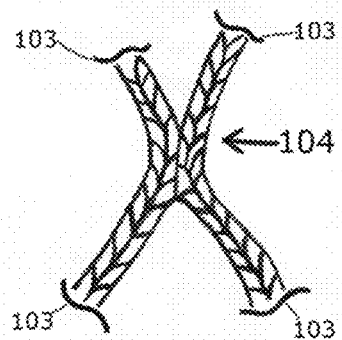
FIG. 1B shows a portion of the unit of FIG. 1A, as a woven element.
Figure 1C:
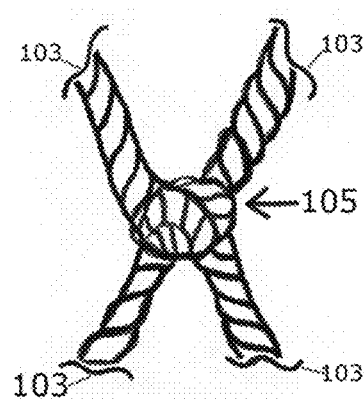
FIG. 1C shows a portion of the unit of FIG. 1A, as a knotted element.

FIG. 1A shows a basic unit of any embodiment of the present invention and is a frontal view of at least one example of the embodiment as a single unit/square as it may be cut from a quantity of net, and shows enlarged details of at least two types of net from which any embodiment may be cut. Subsequent illustrations may sometimes, but not always, be drawn as a grid of straight angled squares for ease in drawing and clarity of viewing, however, net square shape 100 is the actual shape of at least one type fishing net represented by any and all subsequent grid representation. Net square shape 100 is a frontal view of one unit of one embodiment. Single units or unlimited units conjoined or uncut may be used, whether continuous, stacked and layered, or both. Detail 101 shows the primary area of the individual unit/square where the various components described herein are mostly, but not always, attached. Point 101 is the point where the individual strands of the net are joined by its own manufacture that is a strong point for the attachment, linking, or knotting of fasteners, rings, wire or cords, laces and strings of any kind. Attachments can be made by looping, linking, knotting, tying, crimping, gluing, or by any means deemed suitable to affix embellishment or to join individual pieces of net. Detail 102 describes the detail of the embodiment portion of the cut fishing net that extend away from at least one basic unit which will herein be referred to as "lashes". Symbolic wavy line 103 indicates the indefinite manner in which any embodiment may continue. Detail 104, FIG. 1B, is an enlarged view which describes the variety of net considered "woven". Detail 105, FIG. 1C, describes the variety of net considered "twisted and knotted."

Figure 2:
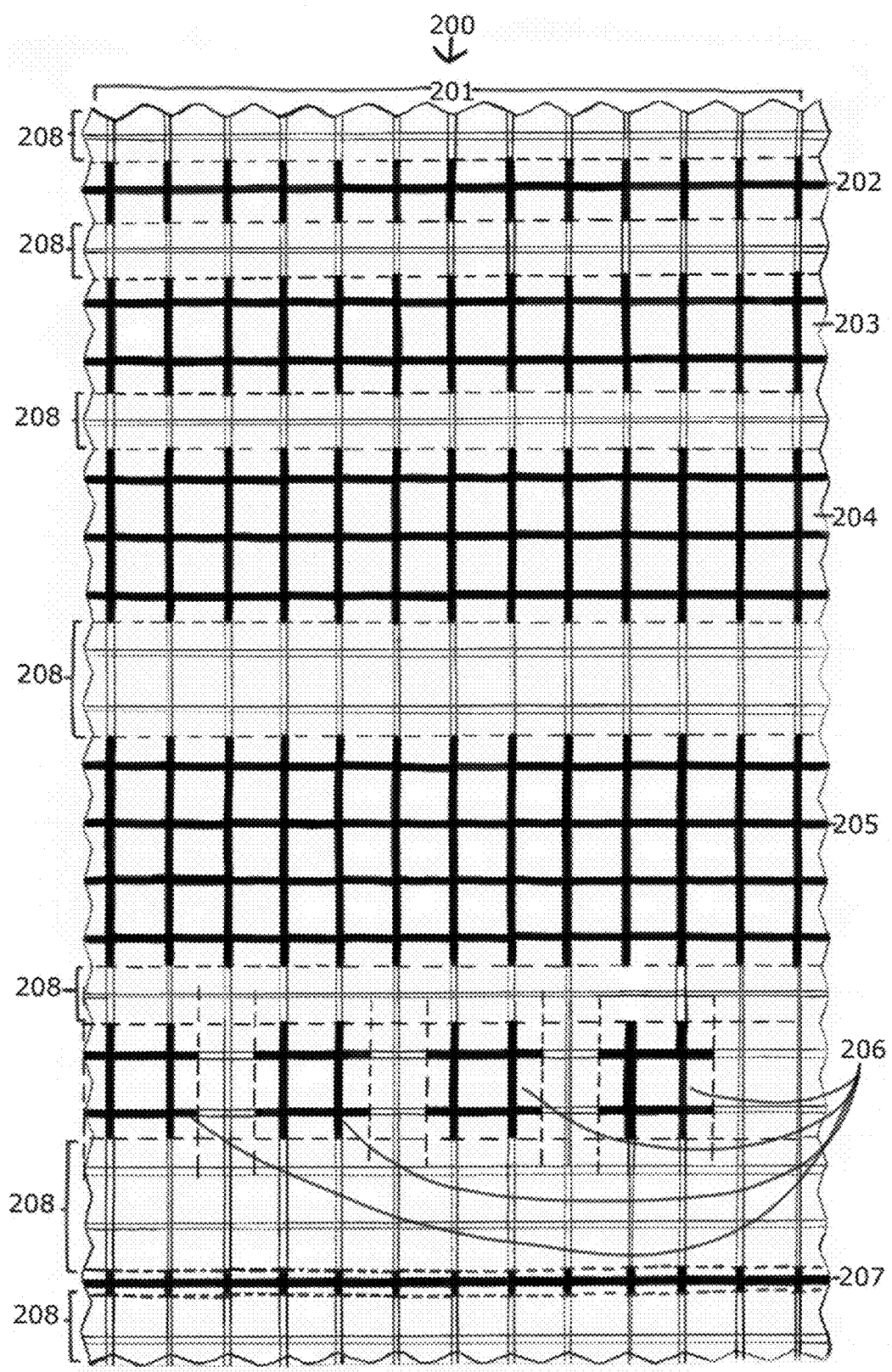
FIG. 2 shows six aspects of embodiments of the present invention cut in a linear fashion and grid pattern from a whole quantity of previously uncut net.

FIG. 2 shows at least six examples of ways the basic embodiment of the invention can be cut in a linear fashion, in a grid pattern, from a quantity of uncut net. Any and all versions of the embodiments shown in FIG. 2 may have lashes of any length, a variety of lengths, or be cut in such a way that the lashes are non-existent. Any and all versions of the embodiment shown in FIG. 2 may extend for as many, or as few, squares a deemed necessary. Note: For illustration purposes, so that the shape of each piece is defined by a border, cuts are shown with a scrap row in between the cut rows. In actual production, the cuts may be made in such a way as to eliminate the scrap by only one cut being necessary to separate the usable embodiments. View 200 consists of: View 201 shows a frontal view of a quantity of net, which in its uncut form may extend vertically or horizontally in an undetermined or irregular size. Detail 202 indicates an embodiment as a single strand of net cut to have "lashes" extending from the strand. Lashes may be any length, or various lengths, or non-existent. Detail 203 is a double strand embodiment which when cut creates a ribbon consisting of a width of one row of squares and may be cut with or without lashes on any or all sides. Detail 204 is a triple strand embodiment which when cut creates a ribbon consisting of a width of two rows of squares and may be cut with or without lashes on any and all sides. Detail 205 is a quadruple strand embodiment which when cut creates a ribbon consisting of a width of three squares and may be cut with or without lashes on any and all sides.

NOTE: Cutting may continue in this fashion increasing width of row of squares as deemed necessary. Detail 206 is single square embodiment pieces, which may be cut with or without lashes on all sides. Detail 207 is an alternate example of view 202, a single strand embodiment cut have no lashes; a cut referred to hereafter as "stub-cut". All spaces marked as 208 represent, for illustrative purposes, the space between the embodiment cuts.

Figure 3:
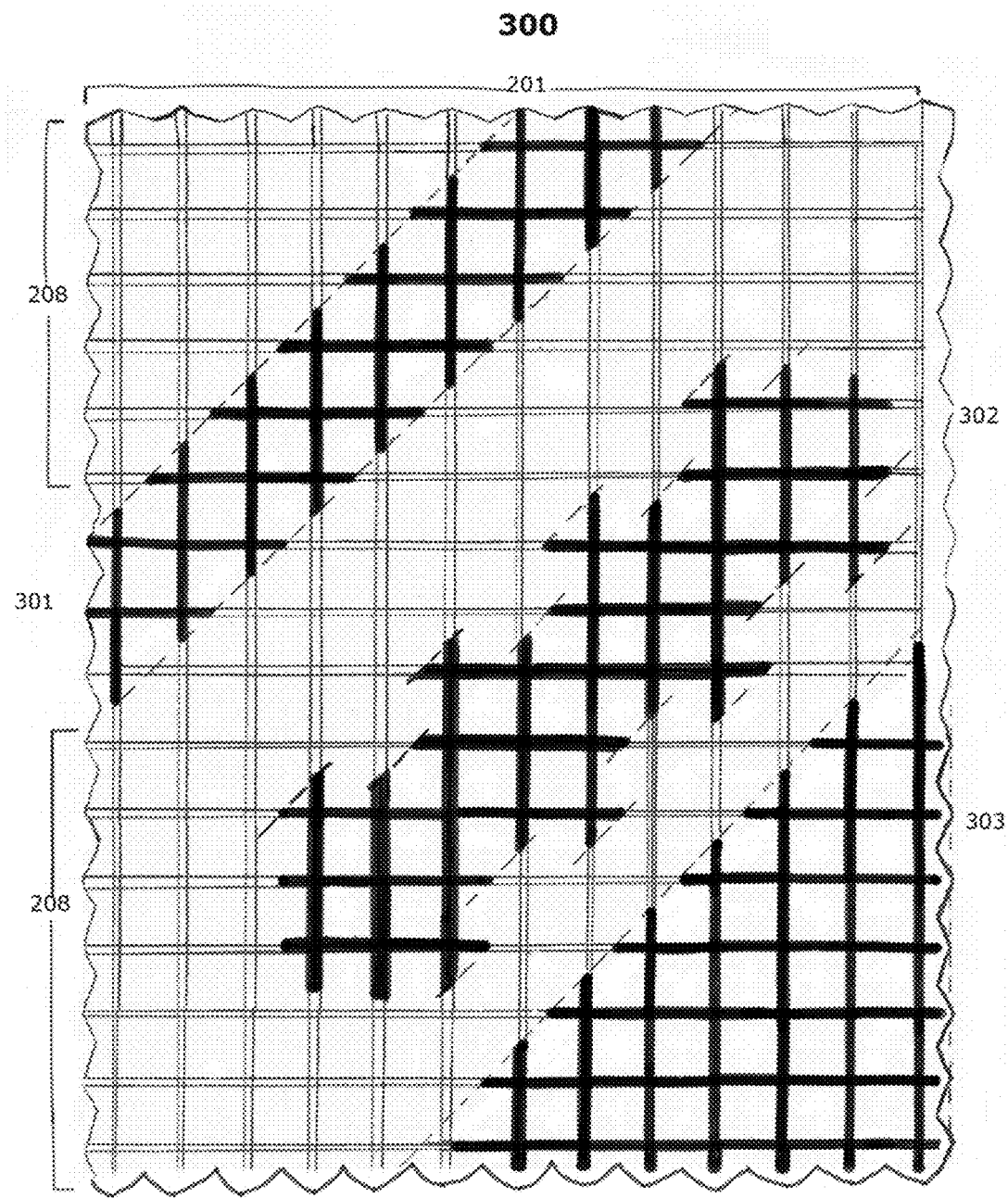
FIG. 3 shows three aspects of embodiments of the present invention cut in a linear fashion in a diagonal or bias-cut Pattern from a whole quantity of previously uncut net.

FIG. 3 shows three examples of ways the embodiment of the invention can be cut in a linear fashion, in a diagonal/bias cut pattern, from a quantity of net. All possible versions of the embodiment represented in FIG. 3 may have lashes of any length, a variety of lengths, or be cut in such a way that the lashes are non-existent. Any and all versions of the embodiment shown in FIG. 3 may extend for as many, or as few individual diamond shapes as deemed necessary. For illustration purposes, so that the shape of each embodiment is defined by a border, cuts are shown with a scrap section between the useable embodiment pieces. In actual production, cuts may be made in such a way as to eliminate the scrap sections. View 300 consists of: view 201, as previously described, shows a frontal view of a quantity of net, which in its uncut form may extend vertically or horizontally in an undetermined or irregular size. Detail 301 represents a view of the embodiment cut as a single row of diagonal squares and may be cut to have lashes of any length extending in any and all directions. Detail 302 shows a top view of the embodiment cut diagonally into a continuous sequence of groups of four squares which may or may not have lashes of any length extending from any and all sides. Detail 303 shows a pattern cut of net which is a embodiment shape of a triangle which may comprise as many or as few squares as deemed necessary and may or may not have extended lashes. As previously described, areas marked 208 are scrap background fields from net which the embodiment pieces were cut. This remaining waste field may or may not contain usable pieces.

Figure 4:
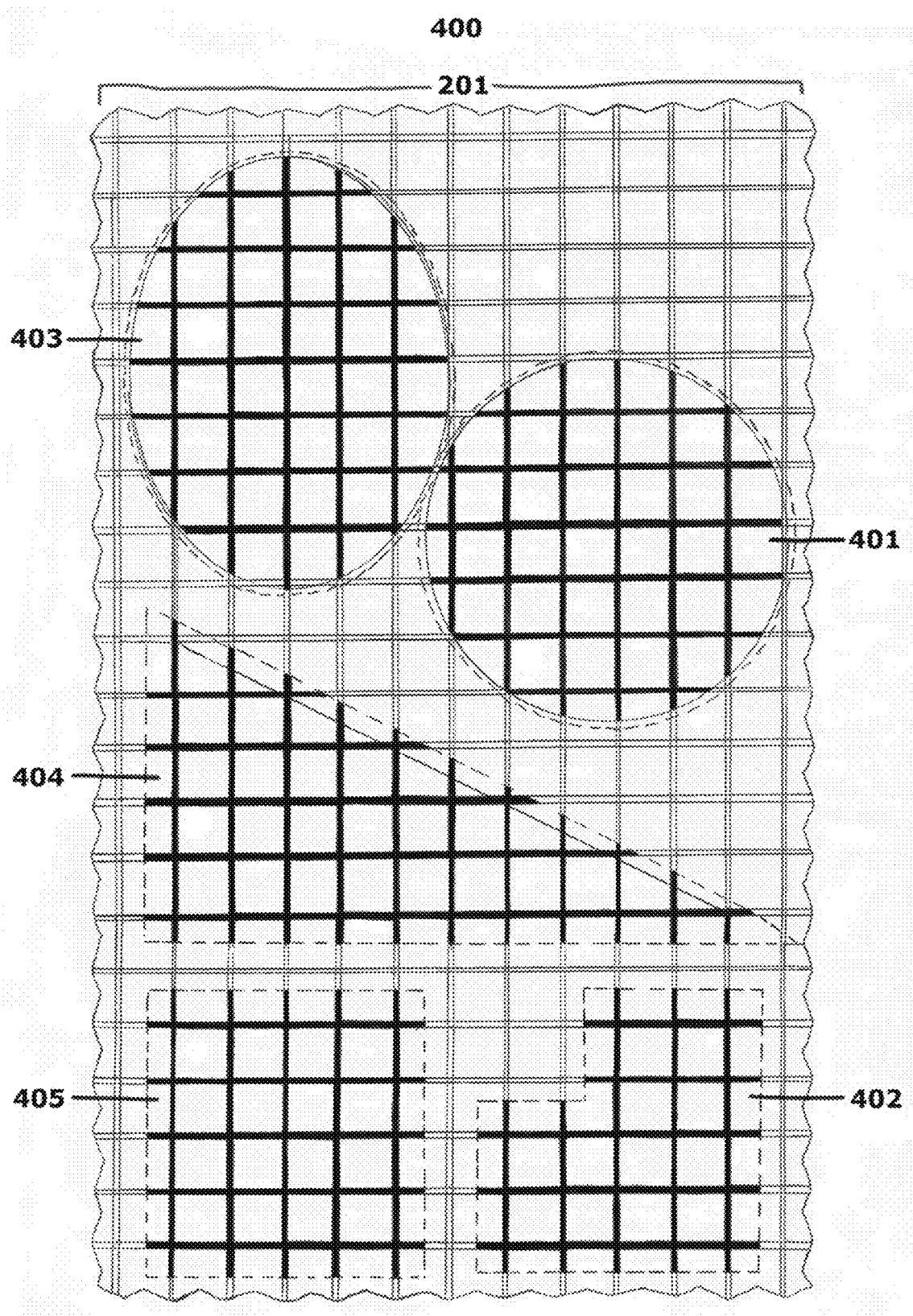
FIG. 4 shows five aspects of embodiments cut into pattern shapes.

FIG. 4 shows various pattern shapes of another embodiment of this invention. View 400 is an overview consisting of: View 201 representing a quantity of net that may extend in any direction and can be of undetermined size and shape. As established in previous illustrations 401, 402, 403, 404, 405 are frontal views, all indicative of various cut pattern shapes of the embodiment of this invention cut from a quantity of net. The individual cut pattern shapes may be any size and comprise as many individual units/squares of net as deemed necessary.

Figure 5:
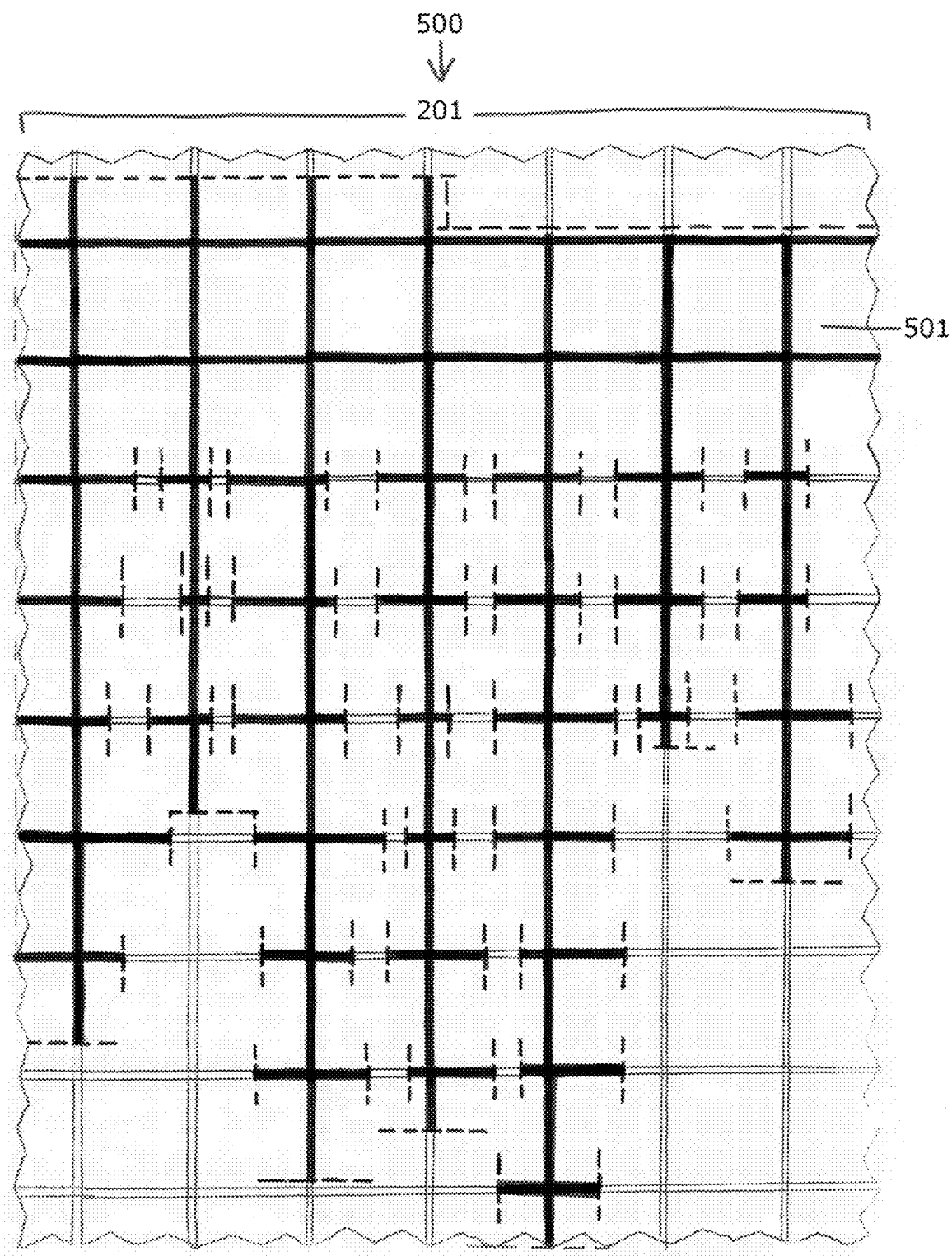
FIG. 5 is a top view of a pattern cut used to make an aspect of the current invention herein referred to as "tassel."

FIG. 5 is a frontal view of at least one pattern used to make the embodiment herein referred to as "tassel." Depending on size of tassel required, this pattern may be extended to an unspecified size/length in any and all directions and may comprise as much net as deemed necessary. View 500 consists of 201 representing a quantity of net, and detail 501 which illustrates pattern and cuts made to a quantity of net to create a tassel. Individual strands of the tassel may, or may not be of varying lengths, or all one length, and may, or may not have lashes of varying length. The resulting cut out piece of net may be folded, rolled, manipulated into a multiple strand tassel and secured by any method or material deemed appropriate by descriptions herein.

Figure 6A:
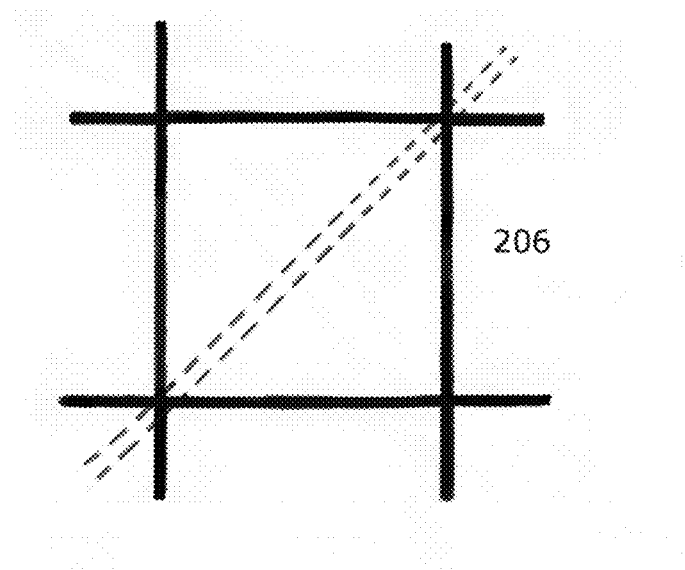
FIG. 6A shows a cut used in creating a "link".
Figure 6B:
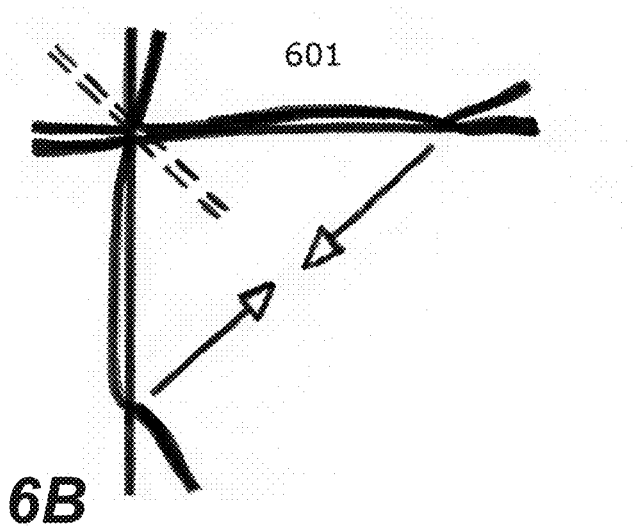
FIG. 6B shows a method of folding the cut to make a "link."
Figure 6C:
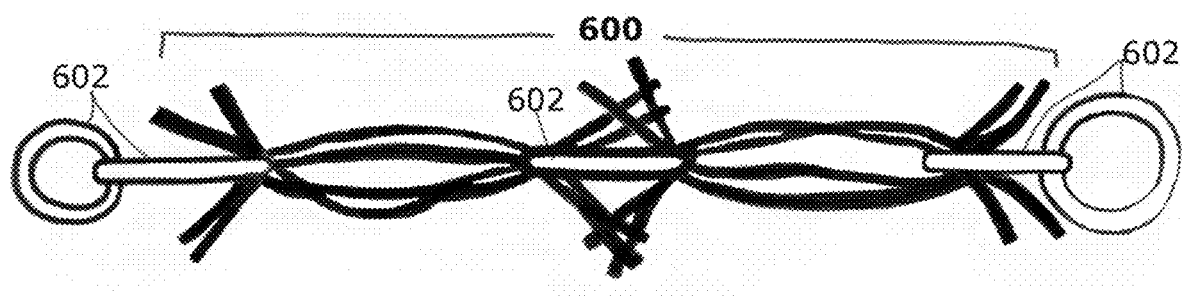
FIG. 6C shows a manner of adding by connection to a cell to make a "link."

FIG. 6A shows a cut used, FIG. 6B a method of folding, and FIG. 6C a manner of adding of at least one of many possible means of connection to a single square (cell) of net thereby creating at least one embodiment herein referred to as "link," which may be connected in succession of as many, or combined in as many variations as necessary, and be made with as few as one or multiple squares. View 600 illustrates one aspect of connecting formed net links by means of using at least one of many possible fasteners or connectors, 602, which could be, but is not limited to, a connector or fastener herein referred to as a "jump ring," a metal ring of any size or shape, with or without, a one split which allows opening and closing, a wired bead of any size or shape, or any combination or sequence of linked materials deemed appropriate to join the net links together or to any net structure or material. As many connectors may be attached through the net, or in succession, as deemed necessary to complete the desired design. FIGS. 6A, B and C show a method by which at least one embodiment of a link may be created by folding 206, a single net square, diagonally to form shape 601 which is folded in half again in a manner indicated by the double dotted lines and arrows. The resulting fold provides two distally located secure areas where any of the means of attaching or connecting by any method may be applied. The number of links and, or fastening links, which may be used to create a finished embodiment of this invention is unlimited.

Figure 7A:
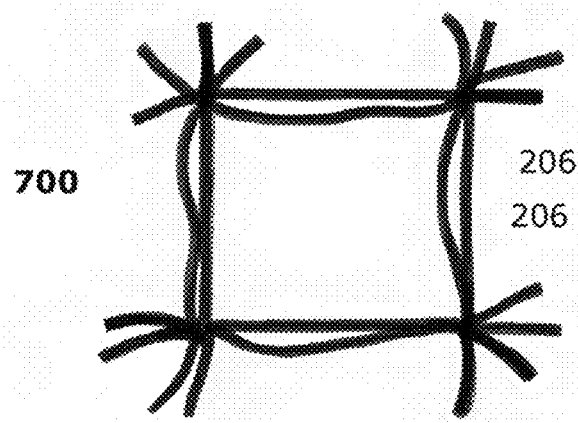
FIG. 7A shows two squares stacked to create multiple ply.
Figure 7B:
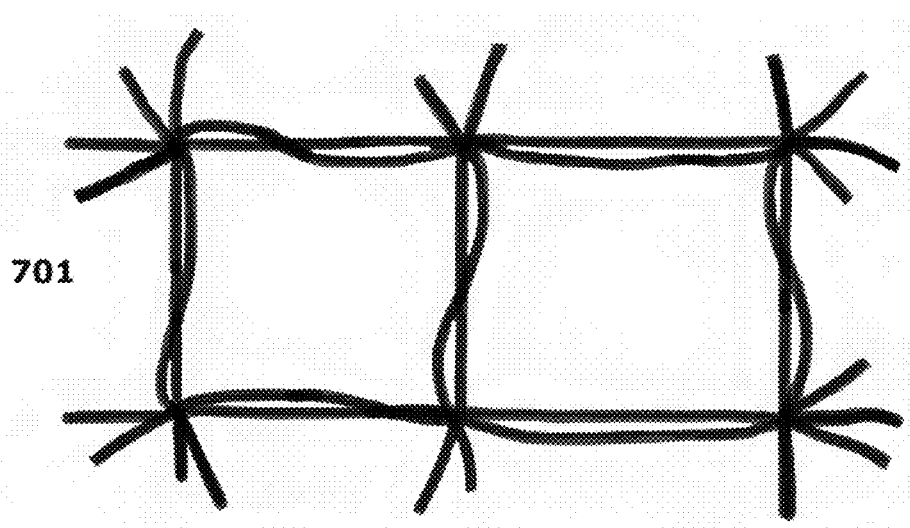
FIG. 7B shows consecutive squares stacked.

FIGS. 7A and 7B show a detailed example of how single and multiple units of net squares with lashes may be stacked upon each other to create plies or layers of net. Detail 700 (FIG. 7A) shows an example of two 206 squares stacked upon each other to create a two-ply square however any number of layers may be used in production. The configurations of the net that may be stacked include but are not limited to all shapes and configurations in all figures herein. Multiple layers, or plies may be used to create dimension and substance in finished embodiments of this invention. Detail 701 (FIG. 7B) is an example of two consecutive squares with lashes stacked together illustrating the continuous manner whereby the method of stacking may be applied. An embodiment of this invention may be as few as one square, but is not limited to any number of squares, and may include as many consecutive squares in length or width as deemed necessary to complete the desired design.

Figure 8A:
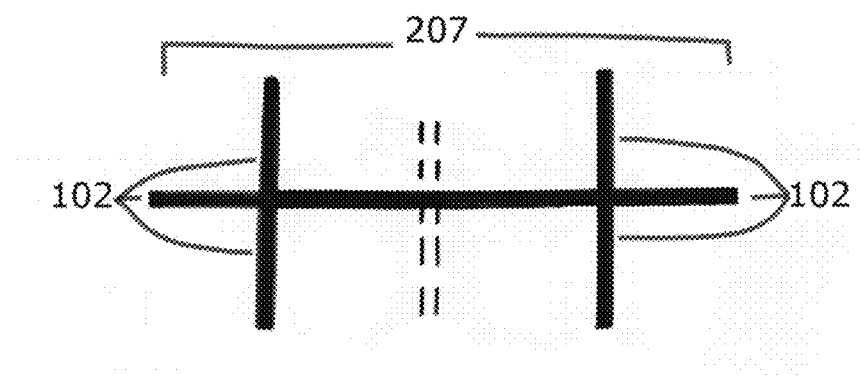
FIG. 8A shows folding of a strand to make a "tassel."
Figure 8B:
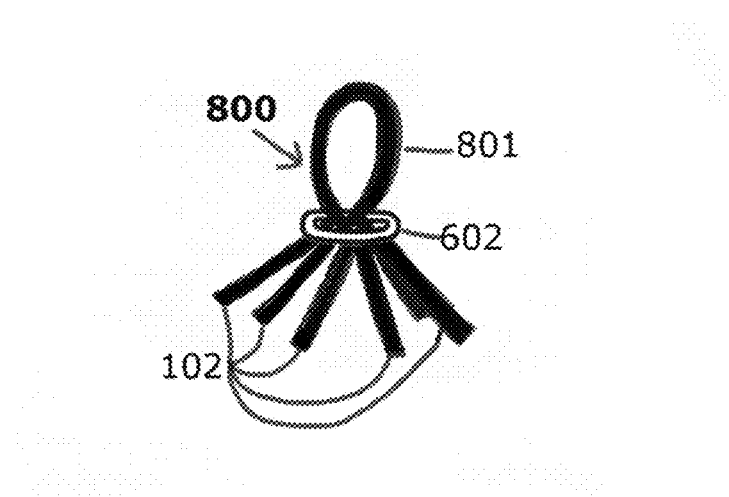
FIG. 8B shows completed "tassel."

FIGS. 8A and B describe at least one embodiment herein referred to as "mini tassel," and a method of manufacture. By folding one segment 207 (FIG. 8A), a single strand of net having lashes 102 on distal ends, frontal view 800 (FIG. 8B), completed mini tassel, has at least one fastener 602 placed over and around eyelet top loop 801 until it is stopped against lashes 102 thereby creating an embodiment of the present invention which may have as few as one or as many segments necessary to create the desired design.

Figure 9A:
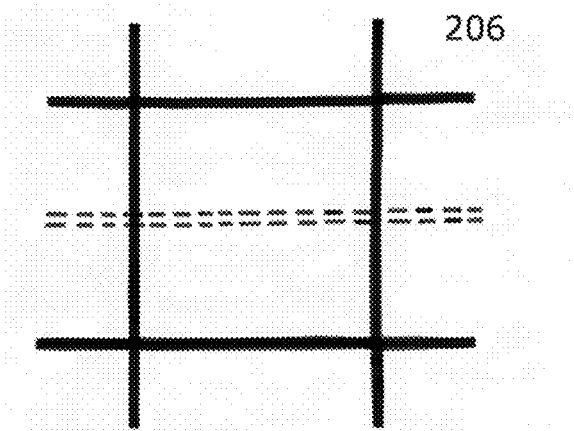
FIG. 9A shows folding a square to make an eyelet.
Figure 9B:
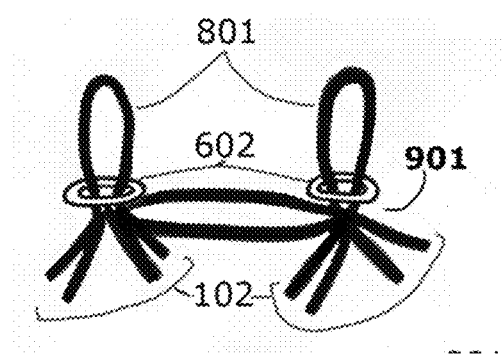
FIG. 9B shows two eyelets with fasteners.
Figure 9C:
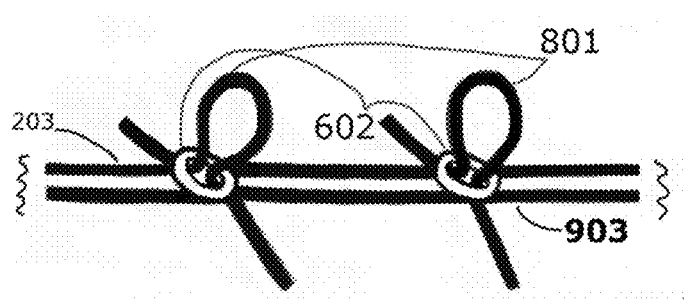
FIG. 9C shows a continuous ribbon of eyelets.
Figure 9D:
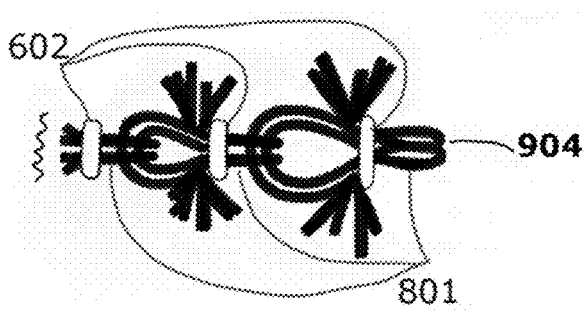
FIG. 9D shows an eyelet chain link.
Figure 9E:
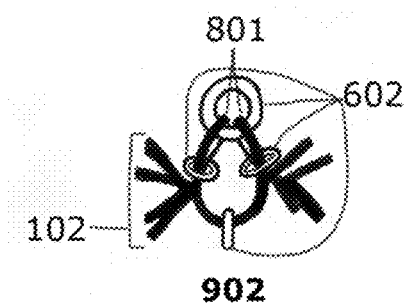
FIG. 9E shows a further eyelet structure.

FIGS. 9A, B, C, D, and E detail an embodiment of the invention herein called "eyelet," "eyelet chain link," and "formed eyelet structure." Details herein are solely to illustrate the process of manufacture and it must be noted that the production of these embodiments will mostly, but not always, consist of an unlimited number, and in any combination, of eyelets or eyelet chain links in succession and may include multiple layers. Illustrations in FIG. 9 begin with previously introduced 206 folded at midpoint (FIG. 9A), having fasteners 602, as previously described, placed over the eyelet loop 801 (FIG. 9B), and allowing lashes 102 of any length to be present. Element 900 indicates possible variations of eyelet, eyelet chain link and eyelet formed structure. Structure 901 shows one square folded into an embodiment that creates two eyelets (FIG. 9B). Structure 901 may further be developed into structure 902 (FIG. 9E) by the addition of fasteners or connectors 602 as previously described. In at least one embodiment of structure 902, connector 602 is passed through the eyelet loops 801, thereby creating a fixed loop. Additionally, connector 602 may be attached to the section of net between the lashes 102 to provide a point from which to expand the design by connecting one or more eyelet structures in successive fashion or by hanging any other type of embellishment described herein. Structure 904 (FIG. 9D) shows at least one method of connecting multiple 206 single squares in unlimited succession to form an eyelet chain link by passing one folded 206 through another 206 that has had both 801 eyelet loops secured together with at least one 602 connector. Structure 903 (FIG. 9C) shows a continuous ribbon of eyelets may be made using a net ribbon as previously described by 203 in FIG. 2 and by securing the eyelets 801 with connectors 602 as previously described.

Figure 10A:
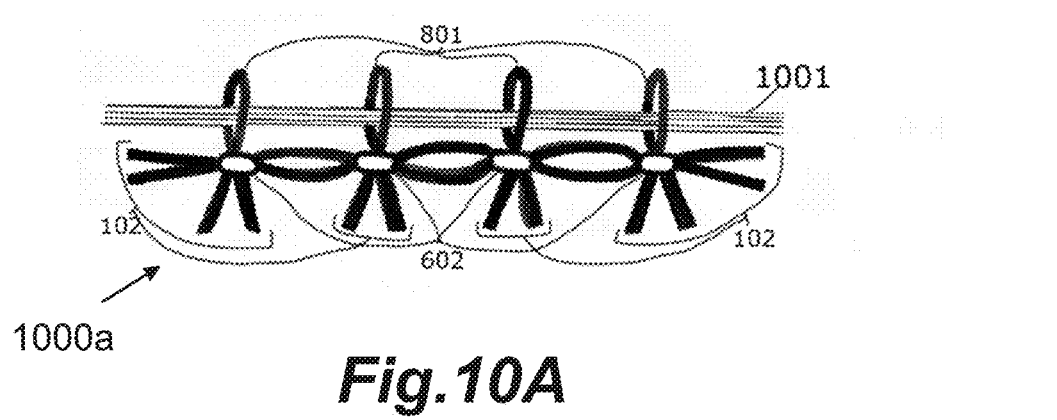
FIG. 10A shows an eyelet structure with stringing material.
Figure 10B:
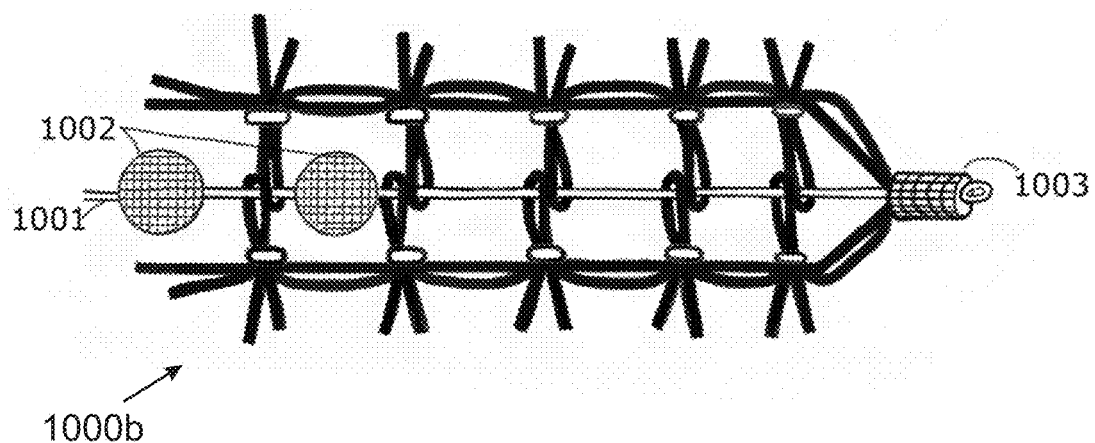
FIG. 10B shows another eyelet structure with stringing material.

FIGS. 10A and B show further use for an embodiment formed eyelet structure as previously described as may be used with multiple eyelet loops in succession to create a laced ribbon to include an unlimited amount of individual loops and links, and may have a stringing material 1001 such as, but not limited to, cord, leather, string, chain, wire, or ribbon passing through the loops of the structure. Beads 1002 of any size, shape or material may be added to the stringing material. Two possible embodiments of the present invention utilizing formed eyelet structures and stringing material as described above are indicated by structure 1000a (FIG. 10A) showing at least one strand of stringing material 1001 passing through successive eyelet loops 801, secured with connectors 602, having lashes 102 present, and structure 1000b (FIG. 10B) which further details aspects of design, use, and embellishment by showing two strands of formed eyelet structure secured over one element of stringing material 1001, upon which at least one type of embellishment such as, but not limited, beads 1002, of any material as previously described may be applied. There may be any number of beads on an embodiment of this design. Ends of the embodiment may be secured into one or more types of finishing piece 1003, which represents a crimp end, cord end, or any finishing fastener which may or may not serve as a clasp, a point at which to attach a clasp, or from which additional material may be attached.

Figure 11A:
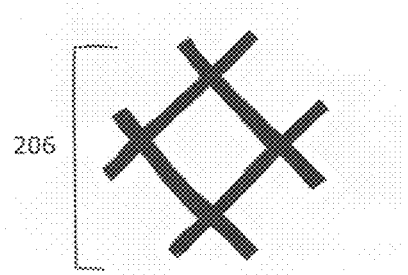
FIG. 11A shows a single square prior to attaching beads.
Figure 11B:
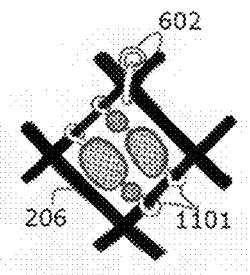
FIG. 11B shows the single square of FIG. 11A with beads attached.
Figure 11C:
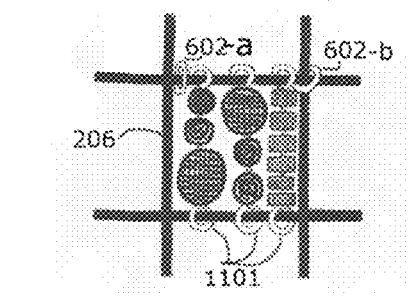
FIG. 11C shows the square of FIG. 11A with more beads attached.

FIGS. 11A, B, C and D illustrate some of the ways various bead configurations may be attached to a number of embodiments of the present invention. Net material used to create cut patterns and structures herein may be single squares 206 (FIG. 11A), groups of multiple squares joined by the original process of net making, or joined by, but not limited to, any means devised or described herein. The net material may be cut in linear horizontal, vertical, or diagonal lines and may comprise many squares in any direction as deemed necessary. One square, or one layer of successive squares, is used for illustrative purposes, however, an unlimited number of consecutive squares, in any and all directions, or in multiple layers, may be used in all structures described herein. Structures 1100 describe a method of embellishment on which basic embodiment 206 provides a base for attaching a decorative element herein referred to as "wired beads" 1101 (See FIG. 11B). Wired bead, or beads, may be as few as one, or an unlimited number, of any bead or bead type element previously described herein, grouped and secured by means of a wire, or any wire type material, of any size passing through or wrapped around said bead and attaching to a net structure by means of rolling and forming rounded "eye" ends that fasten around the strands of net. There may be as few as one wire with one bead, or as many wires with as many beads, whether individual or multiple, in any combinations, as are deemed necessary to complete a design (FIG. 11C). As previously described, 602 represents a jump ring, or any type of fastener, or succession of rings in any number, used to create a loop from which to attach this embodiment to another part, finding, or structure. The rings 602 represented may be of any size, shape, or number, and be attached to the structure in any manner, whether parallel to a net strand 602-a, or diagonally crossing the net strand 602-b.

Figure 11D:
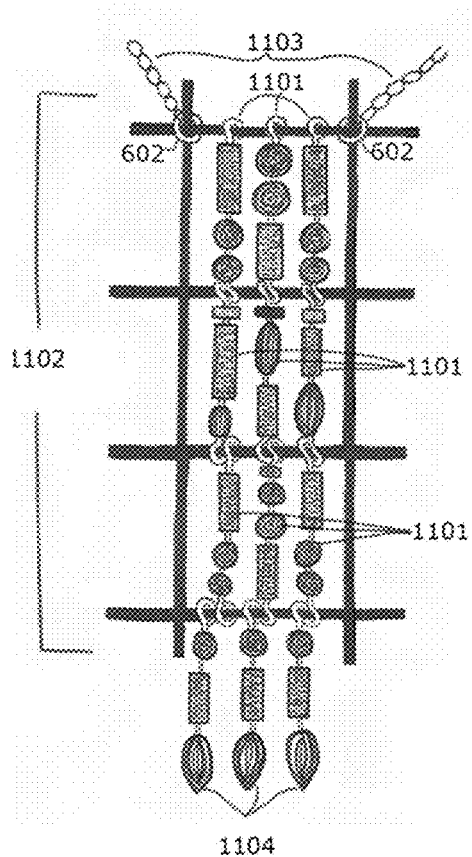
FIG. 11D shows a multiple square structure with beads and embellishments.

Structure 1102 (FIG. 11D) illustrates a method by which a quantity of net cut in ribbon 203 may be embellished by using wired beads 1100 in succession of multiple squares with multiple rows of beads, and may continue for at least one, or as many squares as necessary to complete the desired design. At least one method of attaching a different material, as previously described, is illustrated by chains 1103 being attached to the net ribbon structure by rings 602. At least one alternate configuration of wired bead 1101 is expressed by wired bead drop 1104, whereby said beads are placed onto a wire piece of any precut length that provides a preexisting flat or rounded end to prevent the beads from slipping off and is known to the industry as a "head pin."

Figure 11E:
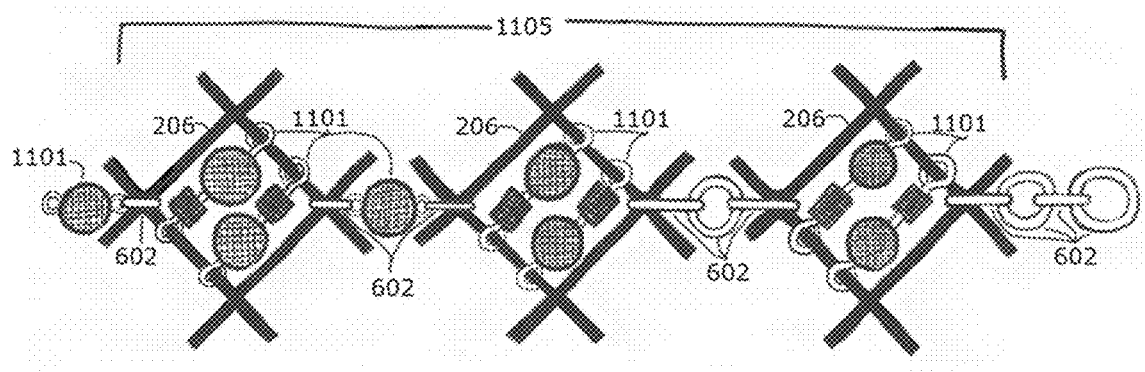
FIG. 11E shows multiple squares with beads in another configuration.

Example 1105 (FIG. 11E) shows at least one of the present invention's methods of connecting single units/square embodiments 206, having been embellished with wired beads 1101, into a unified design constructed by linking the said squares with connectors 602 and wired beads 1101. In example 1105, the individual net squares provide links connected in a linear fashion where the individual squares are arranged in a diagonal pattern by adding connectors 602 across the existing manufactured junction point of the net strands, which may be single connectors, or numerous connectors fastened beside each other, or connected to each other in a chain fashion having any sequence of connectors 602 and wired beads 1101. Any number of net squares and connectors many be used to complete the desired design.

Figure 11F:
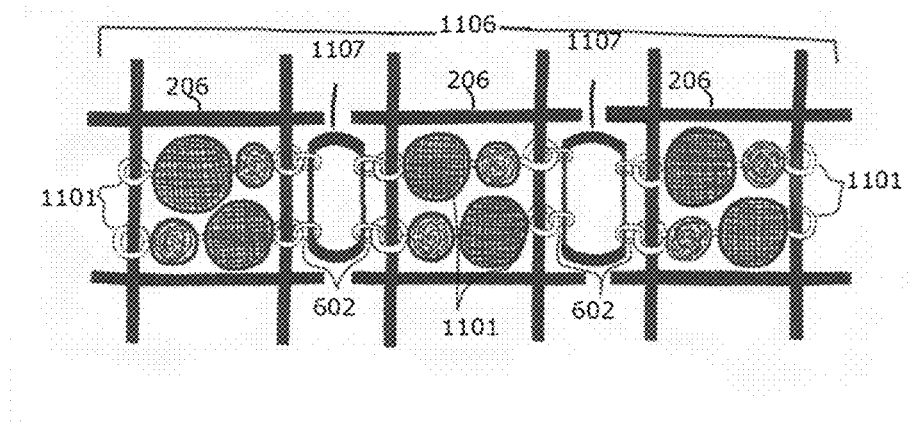
FIG. 11F shows yet another configuration with beads.

Example 1106 FIG. 11F) shows at least one variation of the present invention's method of connecting individual net square embodiments 206 as links in a linear pattern where the individual net squares are arranged with the net strands parallel to each other. A method of connecting the individual squares with connectors 602 is by placing the connectors 602 through the round eye ends of the wired beads 1101 (shown) or by affixing connectors directly onto the strand of net itself (not shown). The linking of materials may go on as described above, or link onto a solid decorative element 1107 of any type as described herein.

Figure 12A:
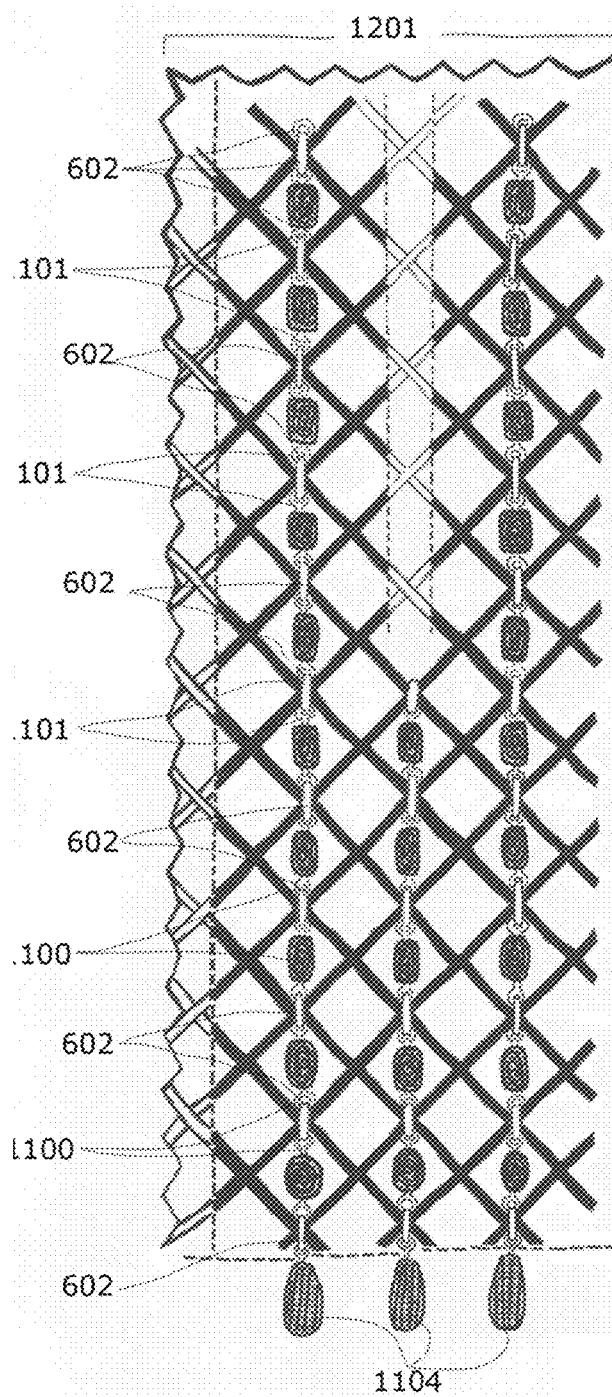
FIG. 12A is a frontal view of a general example of an embodiment of the present invention.
Figure 12B:
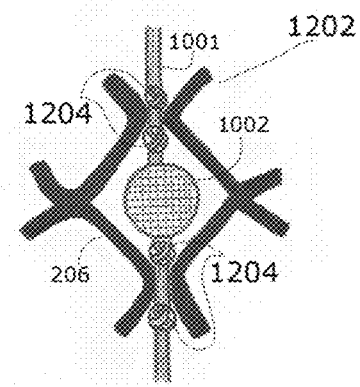
FIG. 12B illustrates one variation wherein affixing beads 1002 onto the net is accomplished by employing cord.
Figure 12C:
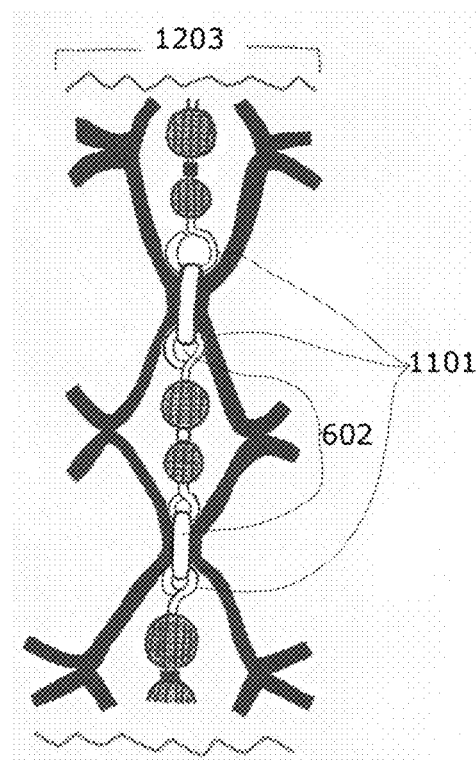
FIG. 12C is an enlarged view.

FIG. 12A is frontal view detail of a general example of an embodiment of the present invention designed and cut as it would be made into a finished product, illustrating how an embodiment that was previously shown may continue on for an unlimited number of consecutive squares in any direction to complete a finished product. An enlarged detail 1203 (FIG. 12C), and a variation detail 1202 (FIG. 12B) are also shown. Structure 1201 shows a widening of the ribbon previously described as 301 into an embodiment having a width of three diagonal squares, a length of any amount of squares deemed necessary, and a partially cut away section from the middle row of squares to allow its use as a bib type of adornment/necklace. Structure 1200 has wired beads 1100 and wired bead drops 1104 attached to its net squares with connectors 602 placed over and around the existing junction point of the net strands inherent to the net's original manufacture. At the top of structure 1201, an additional connector 602 is placed that provides a point from which to attach additional material including, but not limited to, chain, cord, or strap, and any other material discussed herein.

Detail 1203 (FIG. 12C) is an enlarged view of previously discussed elements provided here as aid in viewing. Detail 1202 FIG. 12B) illustrates at least one variation wherein the method of affixing beads 1002 onto the net is accomplished by employing, but not limited to, at least one type of cord or stringing material 1001 discussed herein. Strands of stringing material are passed over and under the net framework, through the beads and secured by knotting 1204. There may be one knot 1204, or a series of any number of knots used to complete this method.

Figure 13A:
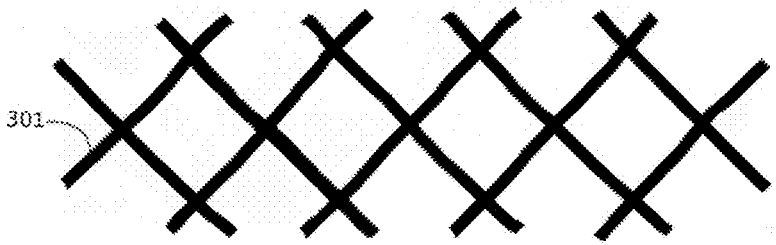
FIG. 13A shows an embodiment with a ribbon cut in diagonal.
Figure 13B:
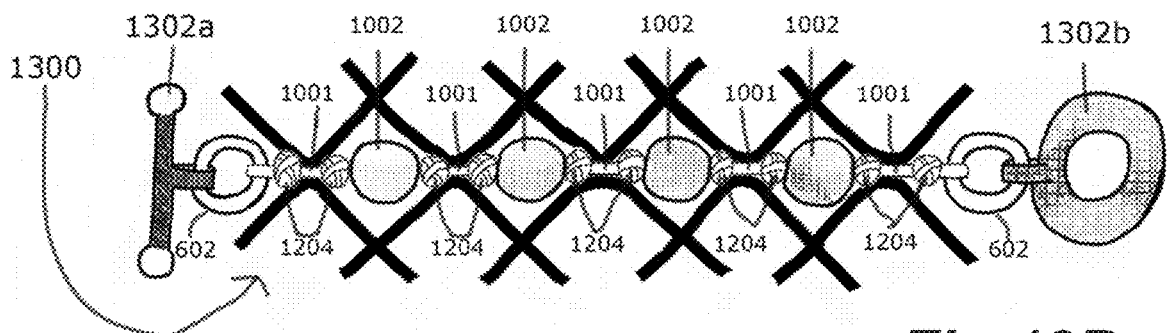
FIG. 13B shows the ribbon of FIG. 13A made into a finished piece.

FIGS. 13A, B, C and D show two top view ways the embodiment, ribbon 301 and 203 may be cut in a linear fashion to create a sequence of net squares in either a diagonal, or a straight pattern, and illustrates, but does not limit, the methods of attaching embellishment to that ribbon, and further describes how the embodiments may be finished and prepared for use. For illustrative purposes, only a short length and single layer of this embodiment of the invention, ribbon, is shown. It may extend to any length or width. As previously described, 301 FIG. 13A) shows the embodiment of this invention as a ribbon cut in the diagonal fashion one square wide and with lashes, which it may or may not have. View 1300 (FIG. 13B) teaches how ribbon 301 may be made into a finished piece including, but not limited to, a bracelet, by affixing beads 1002 by the method of tying by cord 1001. View 1300 illustrates a possible finished version of the embodiment of this invention as a bracelet. Cord 1001 passes through beads 1002 and is fastened onto the net by tying knots 1204. Connector 602 serves as a component onto which a clasp may be attached. An example of one of many types of possible clasps used is a toggle clasp 1302a and 1302b which may be attached to any number or type of connectors per side, or no connector at all, in at least one instance where said stringing material may be extended or added to provide a means of tying the finished piece as a method of closure.

Figure 13C:
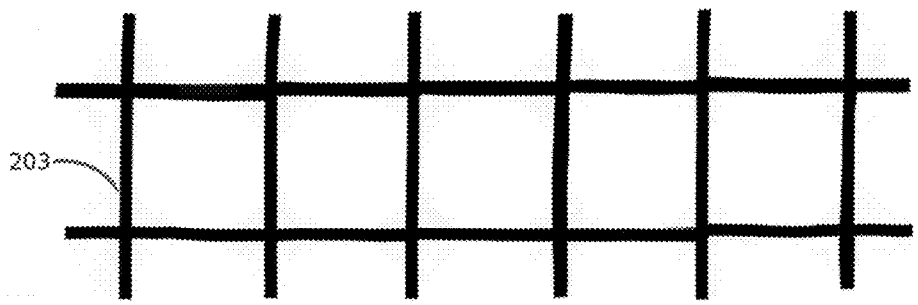
FIG. 13C shows an embodiment with a ribbon cut in a straight fashion.
Figure 13D:
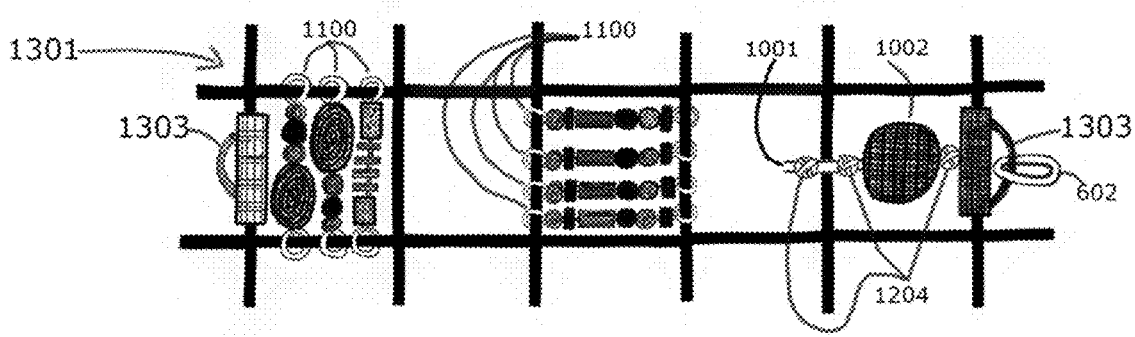
FIG. 13D shows methods for attaching to the ribbon of FIG. 13C.

As previously described, 203 (FIG. 13C) shows an embodiment of this invention as a ribbon cut in a straight fashion so that the squares of net are arranged in a straight line. This ribbon is one square wide and is shown with lashes, which it may or may not have. Structure 1301 FIG. 13D) shows various methods for attaching beaded embellishments to ribbon 203. This example is to illustrate the basic methods by which beads, and components are attached onto the net structure, but it not considered a limitation on the methods that may be used. As previously described, any number of wired beads 1100, in any combination or configuration, may be affixed to the net structure, either vertically placed, horizontally placed, or any combination of vertical and horizontal placement together, according to the direction of the finishing element 1303 shown here as, but not limited to, a crimp-on bar end with loop, or tied on by means of knotting 1204, or other method of securing, such as, but not limited to, the placement of metal rings, beads, or other component as a fixating element, said cord 1001, or stringing material, in any number of beads or strands of stringing material deemed necessary to complete a desired design.

Figure 14D:
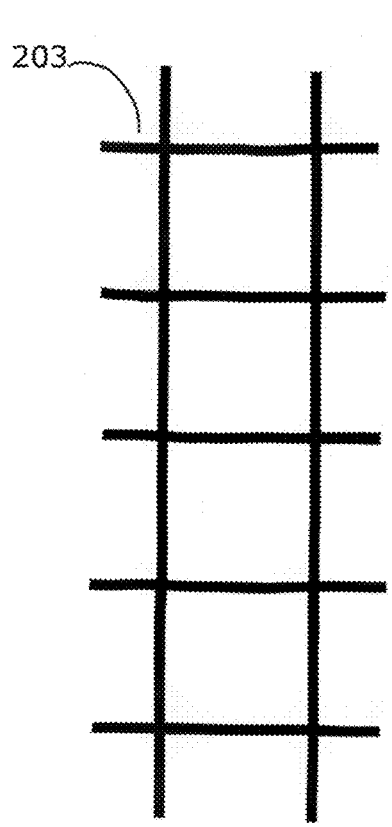
FIG. 14D illustrates compressed roping in an embodiment of the invention.
Figure 14D:
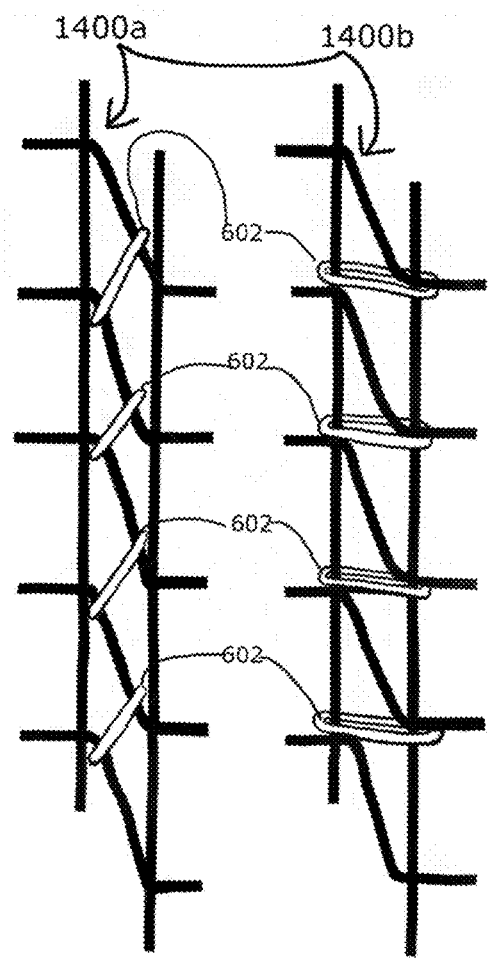
Figure 14D:
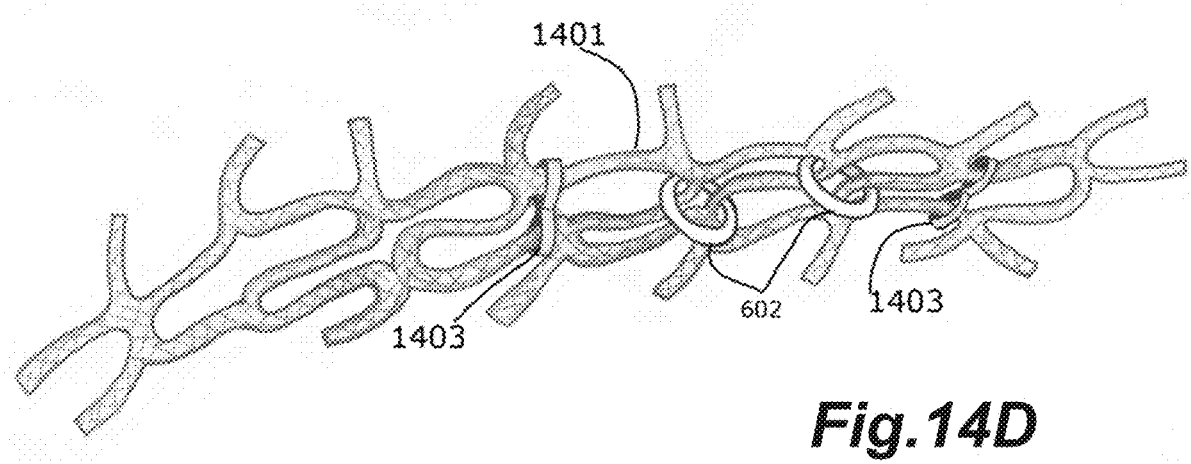

FIGS. 14A, B, C and D show a method of using a ribbon 203 (FIG. 14A) with vertical and horizontal compression of the net by attachment of at least one connector 602 of at least one type affixed to each square to create the embodiment of the present invention herein referred to as "compressed roping" Any and all versions of the compressed roping embodiment may continue for as few or as many squares, or be comprised of as many layers of net, as deemed necessary. Structure 1400a (FIG. 14B) shows the compression of the net by placing the connectors 602 vertically, thereby linking together and compressing the horizontal net strands. Structure 1400b (FIG. 14C) shows the compression of the net by placing the connectors 602 horizontally, thereby linking and compressing the vertical net strands. The inventors used simplified line drawings throughout to communicate the methods of manufacture of the present invention with greater ease, however, example 1401 (FIG. 14D) has been rendered to represent compressed roping as it would appear made with actual fishing net compressed with jump ring connectors 602 and double sided rolled staples 1403.

Figure 15:
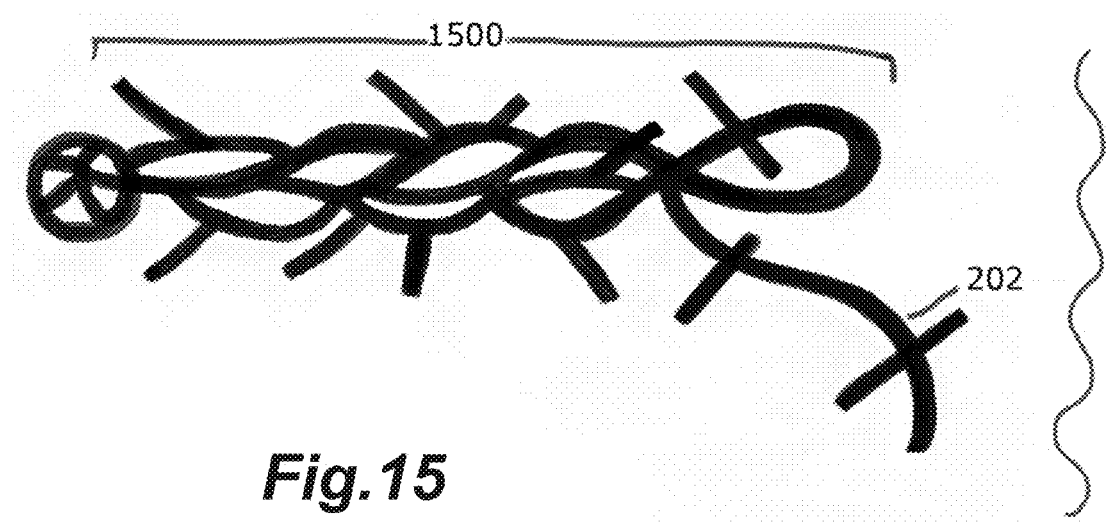
FIG. 15 shows one variation herein called "crochet" according to an embodiment of the invention.

FIG. 15 details an embodiment of the invention referred to as "continuous crochet." One aspect of the method for creating continuous crochet is by a process using at least of strand of net with lashes 202 (shown) or at least one strand of net without lashes 207 (not shown), or a combination of other materials combined with the net strands, a hooked tool generally called a crochet hook, or a finger, to interlock the strands into loops that remain secured together in the desired shape by virtue of being interwoven. Continuous crochet may continue for limitless length or number of rows.

It is noted herein that specific additional elements, including, but to limited to, beads, findings, stringing materials, cords, connectors, and clasps, illustrated the examples put forth herein by the figures are not to be construed as a limitation in embellishment or finishing choices. The inventors chose to illustrate the additional components as simply as possible for ease in communicating the method of manufacture of the present invention. In other embodiments, the use of different components, or different complexity of composition of those components are plausible.

While the written description of the invention herein is intended to enable one of ordinary skill to make and use its best mode, it will also be apparent to the skilled artisan that the embodiments described above are specific examples of a broader invention which may have greater scope than any of the singular descriptions taught. It should also be appreciated that the invention disclosure only provides examples of specific embodiments and methods, and many variations, combination, and equivalents also exist which are not specifically mentioned. The present invention should therefore not be considered as limited to the above-described embodiments, methods, and examples, but instead encompassing all embodiments and methods identified in the accompanying claims, and also those within the scope and spirit of the invention and its equivalents.

The invention claimed is:

1. A decorative article of manufacture, comprising:
    a specific region of fishing net, cut from a larger expanse of fishing net, the fishing net being a structure of a first plurality of first parallel lengths of cord proceeding in a first direction, overlying a plurality of second parallel lengths of cord proceeding in a second direction, with individual ones of the cords of the first plurality joined at intersections with individual ones of cords of the second plurality, forming individual quadrilateral cells each having opposite parallel sides; and
    one or more solid decorative elements attached to one or more sides of individual ones of the quadrilateral cells.

2. The decorative article of claim 1 wherein the fishing net forms a regular matrix of rectangular cells in horizontal rows and vertical columns of cells, and the specific region of fishing net is produced by making two parallel horizontal cuts cutting through vertical cords of the fishing net and two parallel vertical cuts though horizontal cords of the fishing net.

3. The decorative article of claim 2 wherein the resulting specific region comprises a single horizontal length of cord with a specific number of joined intersections, the intersections having lashes as truncated lengths of cord.

4. The decorative article of claim 3 wherein the resulting specific region comprises a single horizontal length of cord with two joined intersections, the intersections having lashes as truncated lengths of cord, wherein the length of cord between the joined intersections is made into a mini-tassel by pulling up cord of a side of a cell into a loop, the loop having two adjacent cord sections, and securing the loop by a fastener surrounding the two adjacent cord sections.

5. The decorative article of claim 3 wherein the length of cord with joined intersections is crocheted in crochet loops producing a continuous crochet article.

6. The decorative article of claim 2 wherein the resulting specific region comprises a single row of rectangular cells with joined intersections at corners of the cells, the intersections having lashes as truncated lengths of cord.

7. The decorative article of claim 6 further comprising one or more connectors spanning across sides of individual ones of the cells in the row of cells, either horizontally or vertically, the connectors compressing the cells, providing a roping effect for the specific region.

8. The decorative article of claim 2 wherein the resulting specific region comprises a single cell with joined intersections at the corners of the cells, the intersections having lashes as truncated lengths of cord.

9. The decorative article of claim 8 wherein the single cell is folded a first time along a diagonal line through two joined intersection of the cell, and then a second time around the resulting center joined intersection, such that all four original sides of the cell are adjacent and parallel, forming a link having a length of a side of the original cell.

10. The decorative article of claim 9 further comprising a plurality of links joined in a line by connectors.

11. The decorative article of claim 10 wherein the connectors are one or more of solid rings of any size or shape, with or without a split which allows opening and closing, a wired bead of any size or shape, or any combination or sequence of linked materials joining the links together or to any other material.

12. The decorative article of claim 2 wherein the resulting specific region comprises multiple rows and multiple columns of cells with joined intersections at corners of the cells, joined intersections on an outer periphery of the specific region having lashes as truncated lengths of cord.

13. The decorative article of claim 1 wherein the fishing net forms a regular matrix of rectangular cells in horizontal rows and vertical columns of cells, and the specific region of fishing net is produced by making two parallel diagonal cuts at a first angle with horizontal through cords of the fishing net, and two parallel diagonal cuts at a second angle with horizontal though cords of the fishing net.

14. The decorative article of claim 1 wherein the fishing net forms a regular matrix of rectangular cells in horizontal rows and vertical columns of cells, and the specific region is produced by cutting through cords of the fishing net from a starting point in a pattern that cuts in at least three directions, returning to the starting point, leaving the specific region with a plurality of adjacent cells.

15. The decorative article of claim 12 wherein cords in sides of cells in the specific region are cut in a manner to produce tassels, as individual secondary regions of the specific region.

16. The decorative article of claim 1 wherein specific regions cut from a fishing net, the specific regions having a common size and shape, are stacked, creating a compound region to which one or more solid decorative elements are attached to complete the decorative article.

17. The decorative article of claim 16 wherein the specific region is in size and shape a single cell of the fishing net.

18. The decorative article of claim 16 wherein the specific region is in size and shape a plurality of adjacent and joined cells.

19. The decorative article of claim 1 further comprising one or more eyelets formed by pulling up cord of a side of a cell into a loop, the loop having two adjacent cord sections, and securing the loop by a fastener surrounding the two adjacent cord sections.

20. The decorative article of claim 19 wherein the fastener is one of solid rings of any size or shape, with or without a split which allows opening and closing, or a wired bead of any size or shape.

21. The decorative article of claim 19 wherein two or more specific regions having eyelets are integrated by passing one or more lengths of stringing material through two or more eyelets in succession.

22. The decorative article of claim 21 wherein the two or more specific regions joined by stringing material through eyelets are further joined by connectors.

23. The decorative article of claim 22 wherein the connectors are one or more of solid rings of any size or shape, with or without a split which allows opening and closing, or a wired bead of any size or shape.

* * * * *